United States Patent [19]

Hampton et al.

[11] Patent Number: 5,048,334

[45] Date of Patent: Sep. 17, 1991

[54] METHOD AND APPARATUS FOR SUBTERRANEAN LIQUID LEVEL MEASUREMENT

[75] Inventors: Duane R. Hampton, Portage; Ross Wagner, Grand Rapids; James Howell, Kalamazoo, all of Mich.

[73] Assignee: The Board of Trustees of Western Michigan University, Kalamazoo, Mich.

[21] Appl. No.: 571,319

[22] Filed: Aug. 22, 1990

[51] Int. Cl.⁵ .............................................. G01F 23/22
[52] U.S. Cl. .................................... 73/290 R; 73/298; 116/206; 116/227; 340/620; 436/40
[58] Field of Search ........... 73/290 R, 298, 73, 290 B; 340/620, 603; 436/2, 39, 40, 60, 139, 164, 169, 170, 183; 116/206, 227; 33/722

[56] References Cited

U.S. PATENT DOCUMENTS

| | | | |
|---|---|---|---|
| 3,745,659 | 7/1973 | Hsu | 33/722 X |
| 3,963,442 | 6/1976 | Bullard et al. | 116/206 X |
| 4,287,472 | 9/1981 | Pan et al. | 340/620 X |
| 4,345,466 | 8/1982 | Lesser | 73/298 |
| 4,407,159 | 10/1983 | Wytaniec | 73/298 X |
| 4,663,614 | 5/1987 | Rauchwerger | 340/620 X |
| 4,728,941 | 3/1988 | Andrejasich | 340/603 X |
| 4,771,006 | 9/1988 | Miller et al. | 436/164 X |
| 4,827,246 | 5/1989 | Dolan et al. | 116/227 X |
| 4,845,978 | 7/1989 | Whitford | 73/73 |

Primary Examiner—William A. Cuchlinski, Jr.
Assistant Examiner—G. Bradley Bennett
Attorney, Agent, or Firm—Flynn, Thiel, Boutell & Tanis

[57] ABSTRACT

A method and an apparatus for determining the thickness of a layer of a first liquid above an interface formed by the first liquid and the second liquid underlying the first liquid in a subterranean formation. The apparatus includes an elongated metal rod having a sharpened distal end. An electrode is provided adjacent the sharpened distal end to indicate when the interface formed by the two liquids has been reached. A lengthwise running elongated slot is provided in the outer surface of the body of the metal rod and contains an indicator strip. The indicator strip is adapted to undergo a color change upon contact with the first liquid. By measuring the length of the indicator strip which has undergone a color change, the thickness of the layer of the first liquid can be determined.

14 Claims, 4 Drawing Sheets

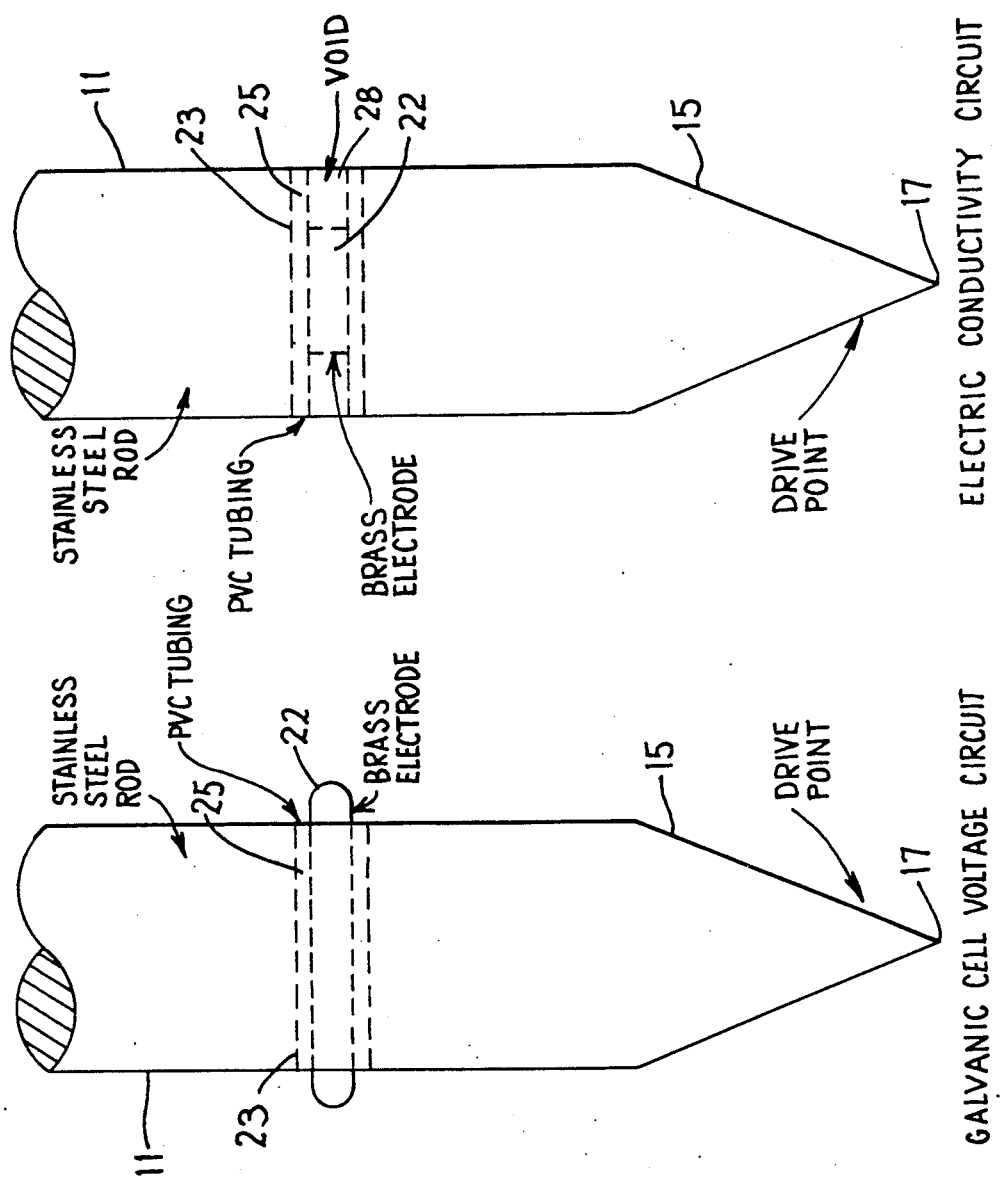

GALVANOMETRIC CELL SCHEMATIC

CONDUCTIVITY SCHEMATIC

METHOD AND APPARATUS FOR SUBTERRANEAN LIQUID LEVEL MEASUREMENT

BACKGROUND OF THE INVENTION

In these days of heightened, ecological awareness, the rapid detection and cleanup of hydrocarbon spills has become an economic and public relations necessity. One of the primary variables to be determined at any hydrocarbon product spill site is the amount of the hydrocarbon that has spilled into the environment. The quantity of the hydrocarbon spilled is the main factor in determining whether the spill site needs remediation and selecting an appropriate remedial response.

However, the determination of this variable is usually extremely difficult. Some of the hydrocarbon spill is lost due to volatilization and biodegradation. A significant portion of the spill remains absorbed and immobile on soils through which the spill percolates. In a great number of cases, the spill volume is large enough to infiltrate through the earth surface to aquifiers, permeable subterranean formations where the soil is saturated with water. At these locations, the "free" or mobile hydrocarbon begins to pool. As this free hydrocarbon begins to diffuse, some of it is dissolved in the adjacent ground water and removed from the site of the spill via the flow of the ground water. All of these quantities are difficult to measure and become more difficult as time elapses.

A traditional method of estimating the free volume of the hydrocarbon spill has involved the use of monitoring wells. The monitoring wells are placed at various locations around the spill and the thickness of the hydrocarbon layers are measured at these locations using various methods. These thickness values at various points in the aquifer are used sometimes without modification, to draw a contour map of product thickness. The volume of the free hydrocarbon in the aquifer is then determined by using a planimeter on the contour map. The free hydrocarbon volume was taken to be the aquifer product thickness value best determined times the porosity times an assumed value for product saturation. This method grossly overestimated the recoverable hydrocarbon volume at many sites which in turn resulted in unnecessary expense because of the overdesign of recovery facilities.

SUMMARY OF THE INVENTION

It is an object of the present invention to provide a method and an apparatus for accurately and speedily determining the thickness of a hydrocarbon layer in an aquifer. That value can then be used in calculating spill volume.

The method of the invention includes the steps of inserting a probe into the ground above an interface formed by a first and a second liquid, continuing the insertion of the probe into the ground until the probe indicates that it is in contact with the interface formed by the first and second liquids, allowing the first liquid to contact an indicator strip contained on the probe, withdrawing the probe from the ground, and determining the thickness of the layer of the first liquid by measuring the length of the indicator strip which has undergone a color change from contact with the first liquid.

The hydrocarbon layer thickness so determined does not include the height of the oil-air capillary fringe since that oil held by capillarity above the oil-air table does not closely contact the indicator strip. The hydrocarbon thickness includes the zone of mobile hydrocarbon, which produces a solid color change on the indicator strip, and the oil-water capillary fringe, which produces a spotty color change due to trapped ganglia.

It is a further object of the present invention to provide a probe which is capable of carrying out the above-described method. The probe comprises an elongated metal rod having a lengthwise extending elongated slot provided therein, a proximal end and a distal end. A proximal end has a threaded cavity provided therein and the distal end terminates in a sharpened or driving point. An elongated indicator strip which undergoes a color change upon contact with the first liquid layer is removably mounted in the elongated slot. A first electrode is provided adjacent the distal end of the metal rod and is used in the location of the subterranean interface between the first and second liquids.

In one embodiment of the present invention, the rod is made of a different material than the first electrode and serves as a second electrode. The first and second electrodes form a galvanic cell when both are immersed in water (the second liquid) and are used to locate the interface between the first and second liquid layers by measuring the amount of voltage flowing therebetween.

In a second embodiment of the present invention, the first electrode and the metal rod can be made of the same material and form part of an electric conductivity circuit. An external circuit box provides a current to the electrodes and the location of the interface between the first and second liquid layers is determined by monitoring the current flow between the first electrode and the metal rod while the rod is inserted in the ground. Current can flow readily only after the first electrode is immersed in water (the second liquid).

Extension metal rod lengths, which have a threaded stud provided on a distal end thereof and is adapted to mate with the threaded cavity of the proximal end of the metal rod, may be used to locate the interface between a first and second liquid layer located underneath the ground at a depth of greater than the length of the metal rod.

If a monitoring well screened in the hydrocarbon layer is available at a site, the oil/water interface depth can be estimated without using this invention. Then the rod can be inserted into the ground until the indicator strip is below that depth. The thickness of the hydrocarbon layer can be determined using the length of color change on the indicator strip.

BRIEF DESCRIPTION OF THE DRAWINGS

The invention is further described by way of example with reference to the accompanying drawings in which:

FIG. 2 is an enlarged partial view showing the electrode placement of the galvanic cell of one embodiment of the present invention;

FIG. 3 is an enlarged partial view showing the electrode placement of the electric conductivity circuit of another embodiment of the present invention;

DETAILED DESCRIPTION OF THE PREFERRED EMBODIMENTS

Figure 1:
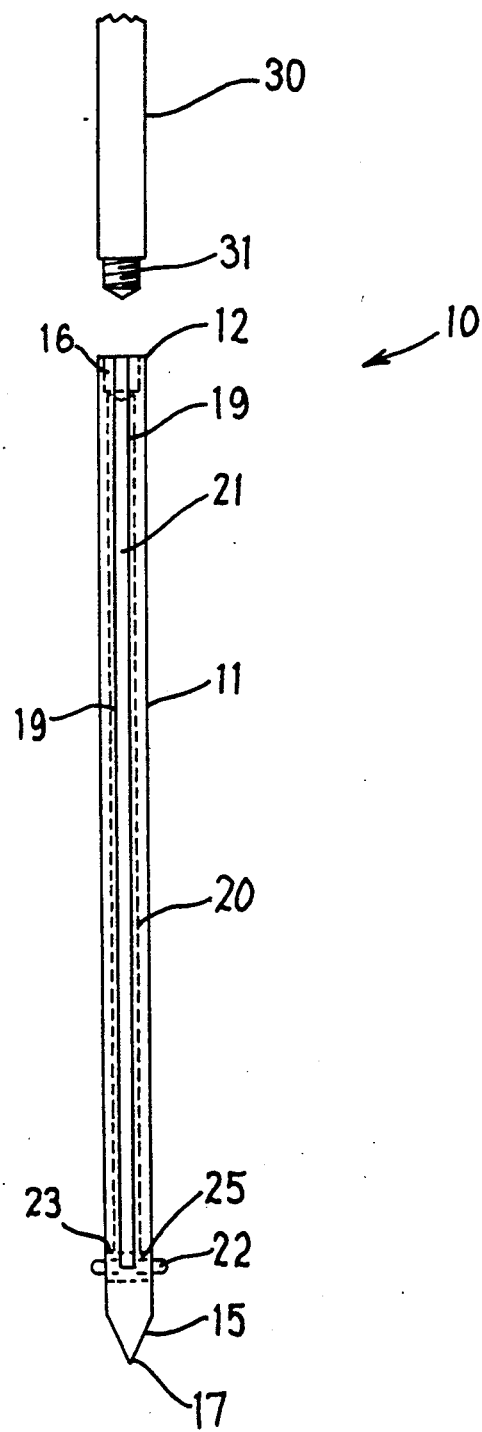
FIG. 1 is a front elevation view of an embodiment of a probe according to the present invention.

FIG. 1 illustrates a first embodiment of a probe according to the present invention. The probe 10 comprises a body in the form of an elongated metal rod 11 having a proximal end 12 and a distal end 15. A threaded cavity 16 is provided in the metal rod proximal end 12 and is adapted to receive a threaded male stud 31 in threaded engagement therein. The distal end 15 of the metal rod 11 terminates in a sharpened end or drive point 17 in order to aid in the penetration of the metal rod 11 through the soil. The metal rod 11 can be made of any suitable conductive metal with stainless steel being especially preferred. The length and width dimensions of the metal rod 11 are not critical and can be varied according to the needs of the user.

A longitudinally extending slot 20 of rectangular configuration is provided in a central portion of the metal rod 11. An elongated indicator strip 21 is removably contained within the slot 20 in a manner so as to allow the face of the indicator strip 21 to be contacted by an external agent. The indicator strip 21 may be confined within the elongated slot 20 by lips 19 which engage with and bear upon the upper outer surfaces of the indicator strip 21. Alternatively, the indicator strip 21 can be attached to the probe 10 with screws (not shown).

The indicator strip 21 comprises a dimethylsiloxane-based polymer and a hydrophobic dye. The hydrophobic dye is mixed with the polymer to form the indicator strip 21. The polymer is permeable to hydrocarbons and organics but not to water. The hydrocarbon or organic in contact with the polymer will diffuse into the polymer and dissolve the dye and thereby cause a change in color intensity in the strip 21. When removed from contact with the hydrocarbon or organic solvent, the contacted portion of the indicator strip 21 will revert to its original intensity due to the volatilization of the hydrocarbon or organic solvent.

A radially extending opening 23 is provided adjacent the metal rod distal end 15 for containing a first electrode 22. In a first embodiment of the present invention, the first electrode 22 comprises a metal bar which is contained in and extends through the radially extending opening 23 provided adjacent the metal rod distal end 15. The first electrode 22 is preferably made of a metal which is fairly noble, such as brass.

As shown in FIG. 2, the first electrode is fitted and secured inside of an insulating tubing 25, such as a PVC tubing, which in turn is then fitted and secured within the radially extending opening 23 so that direct electrical contact is prevented between the first electrode 22 and the metal rod 11 and the ends of the first electrode 22 slightly extend from the outer surface of the metal rod 11. In order to prevent damage to the first electrode during the driving of the probe 10 into the soil, the first electrode 22 should not extend any further than about three millimeters beyond the outside surface of the metal rod 11. The first electrode 22 is then soldered to a wire (not shown) that runs along the length of the probe 10. The wire can be either contained in a longitudinally extending groove (not shown) provided in the metal rod 11 or taped or secured along the length of the metal rod 11 in any desirable fashion.

As shown in FIGS. 1 and 2, in a first embodiment of the present invention, the metal rod 11 serves as a second electrode. As such, the metal rod 11 must be made of a different metal than the first electrode.

Figure 4:
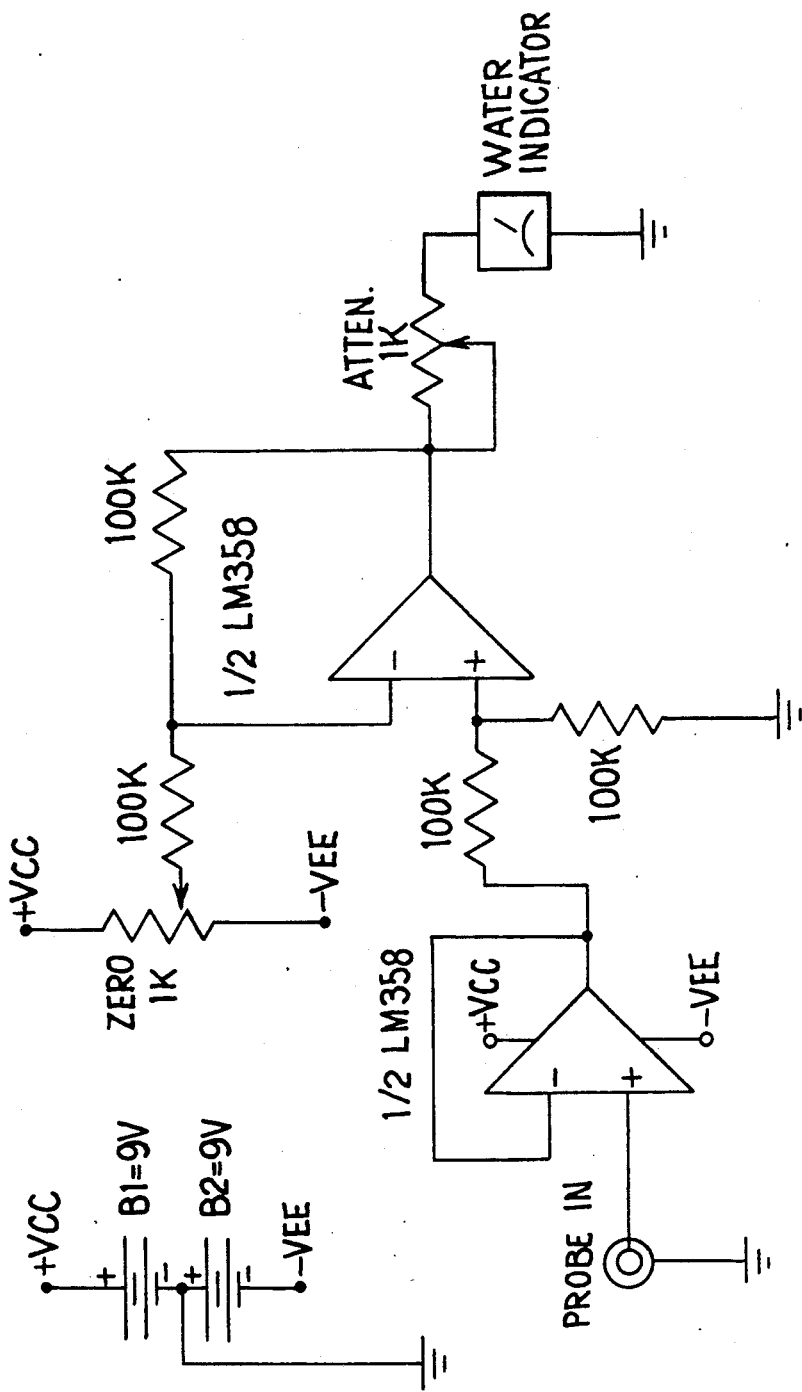
FIG. 4 is the electrical schematic diagram for the galvanic cell of the present invention.

A conventional drive hammer coupler (not shown) can be screwed into the threaded cavity 16 provided in the metal rod proximal end 12. The metal of the metal rod 11 is electrically connected to a phono jack located on the drive hammer coupler. The wire from the first electrode 22 is connected to the insulated post of the phono jack. The circuit is completed by a phono wire from the phono jack to a separate circuit box. As shown in FIG. 4, this external surface box contains a voltmeter and the proper electronics to display the voltage potential produced by the galvanic cell formed by the first electrode 22 and the metal rod 11.

The presence of moisture between the two electrodes produces a redox reaction between the first and second electrodes. As the reaction proceeds, ions in the two electrodes are consumed and form a chemical gradient. The movement of ions toward the electrodes, in response to this chemical gradient, becomes a diffusion current. This diffusion current between the electrodes is essentially a galvanic cell capable of producing a voltage of from 0 to 0.6 volts. Another type of current, in addition to the diffusion current, is produced when driving the probe 10 through moist sediments. This is a result of ions in the water being introduced to the electrodes. This current is termed the convection current.

Before driving the probe 10 into the ground, the volt meter is adjusted by being set to zero. The electrode 22 is placed in water and the sensitivity of the meter adjusted. The probe 10 is removed from the water, dried and the voltmeter reset to zero.

As the probe is driven into the ground, the deflection of the voltmeter is monitored. With each successive hammer blow, the voltmeter shows a voltage jump and then a slow drop in voltage. The jump occurs as the convection current is measured. The voltage drops as the ions finish their migration to the electrodes and the meter reads only the voltage produced by the diffusion current. The probe 10 is driven until the voltage displayed compares to the sensitivity level preset in water. The interface between the hydrocarbon or organic liquid and water is thus located.

After the water/hydrocarbon or organic liquid interface is located, the probe 10 is allowed to sit for a period of time from about 5 to 30 minutes to allow the hydrocarbon or organic liquid to diffuse into the dimethylsiloxane polymer of the indicator strip 21 and dissolve the dye, thereby causing a change in the indicator strip 21 color intensity. After a suitable period of time, the probe 10 is withdrawn from the ground and the thickness of the hydrocarbon or organic liquid layer is determined by measuring the length of the indicator strip 21 which has undergone the color change. When removed from contact with the hydrocarbon or organic liquid, the portion absorbed into the indicator strip 21 will volatilize and thereby cause the color of the indicator strip 21 to revert to its original intensity.

Figure 5:
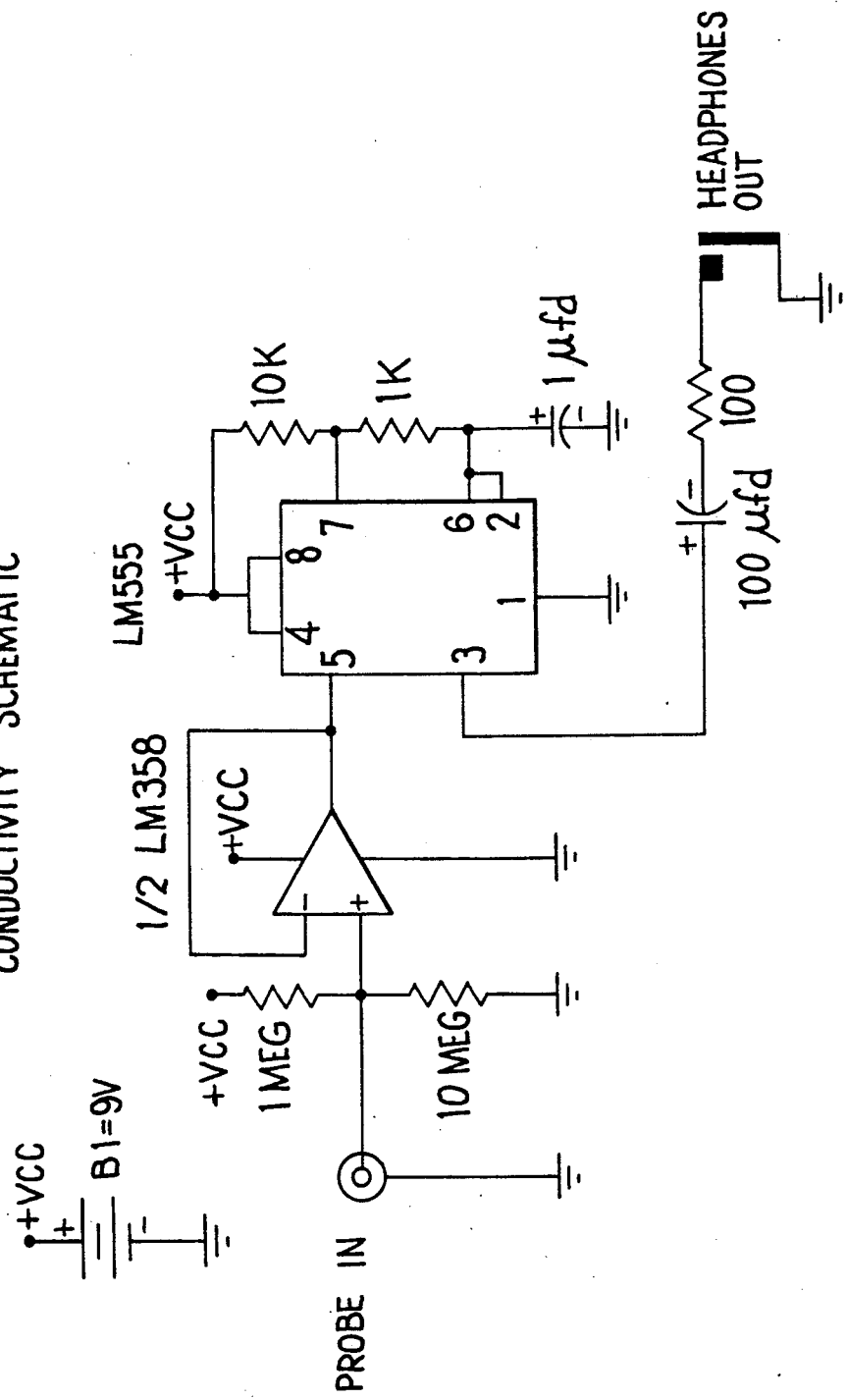
FIG. 5 is the electrical schematic diagram for the conductivity circuit of the present invention.

The second embodiment of the present invention is illustrated in FIGS. 3 and 5. In the second embodiment, the water/hydrocarbon or organic liquid interface is located by an electric conductivity circuit. In this second embodiment of the present invention, the first electrode 22 is again contained within a radially extending opening 23 provided in the metal rod 11 adjacent its distal end 15. The first electrode 22 is again fitted and confined within an insulating tubing, such as a PVC tubing, which in turn is fitted and confined inside the radially extending opening 23 in a manner so that the first electrode 22 and the metal rod 11 are not in direct electrical contact with each other.

In the second embodiment of the present invention, the first electrode 22 does not extend throughout the entire width of the metal rod 11, but rather, is centered about the vertical axis of the metal rod 11 and has a void space of about 4 or 5 millimeters between its ends and the outside surface of the metal rod 11. The first electrode can be made of brass or any conductive metal. In this second embodiment of the present invention, the metal of the metal rod 11, which is preferably stainless steel, again acts as the second electrode. Electrical connection of the electrodes to an external circuit box is completed in the same manner as that for the first embodiment of the present invention.

As shown in FIG. 5, the separate circuit box uses a battery to provide a current to the electrodes. The circuit box also produces an audio signal that is heard with earphones. The tone of the audio signal increases in pitch as the conductivity improves between the first electrode 22 and the metal rod 11. As the probe 10 is driven to the ground, a slight increase in pitch is heard as moist grains of sand enter the voids 28 and touch the first electrode 22. As the moisture content of the soil rises, so does the pitch of the signal. When the water table is reached at the water/hydrocarbon or organic liquid interface, the audio signal rapidly rises in pitch. Once the water/hydrocarbon or organic liquid interface is located, the procedure for determining the thickness of the hydrocarbon or organic liquid layer is identical to that of the first embodiment of the present invention.

As shown in FIG. 1, an extension flight 30 can be provided for the probe 10 of the present invention. Extension flight 30 is identical to the metal rod 11 with the exceptions being that it does not contain an indicator strip or any separate electrodes, and a metal threaded stud 31, which is adapted to mate in the metal rod proximal end cavity 16, is provided on a distal end of the extension flight 30 in order to couple the extension flight 30 with the metal rod 11. The proximal end (not shown) of the extension flight 30 contains a threaded cavity identical to the threaded cavity 16 of the metal rod 11 in order to enable additional extension flights to be coupled thereto.

DESCRIPTION OF OPERATION

The subsurface probe 10 of the present invention is operated in the following manner. An indicator strip 21 is placed in the lengthwise extending elongated slot 20 of the elongated metal rod 11. A drive coupler is screwed to the top of the probe by use of the end cavity 16. The electrical circuitry is then tested as described above. After the circuitry is tested, the first electrode 22 is then dried. A drive hammer is attached to the drive coupler and the probe is driven into the ground. The voltmeter or the audio signal is constantly monitored during the driving of the probe. The drive coupler is removed from the probe 10 and extension flights 30 are added as necessary. When the water/hydrocarbon or organic liquid interface is located, the probe 10 is driven a few more centimeters until the interface is above the bottom of the indicator strip and then the depth can be marked on the probe 10. The probe 10 is allowed to remain in this position for a period of time to allow the indicator strip 21 to absorb any hydrocarbon or organic liquid that may be present. The probe 10 is then withdrawn from the ground by pounding upward on the drive hammer. After the withdrawal of the probe 10 from the ground, the length of the area on the indicator strip 21 which has undergone a color change is measured. After this measurement is obtained, the first electrode 22 is then cleaned or the voids 28 enclosing the first electrode 22 are cleaned out. The hydrocarbon or organic liquid is allowed to volatilize from the indicator strip 21 and the probe is again ready for use.

It is understood that the above-described arrangements are merely illustrative of many possible specific embodiments which represent the present invention. Numerous and varied other arrangements can be readily be devised without departing from the spirit and scope of the present invention.

The embodiments of the invention in which an exclusive property or privilege is claimed are defined as follows:

1. An apparatus for measuring the thickness of a layer of a first liquid above an interface formed by the first liquid and a second liquid in an underground formation, said apparatus comprising means for detecting said interface and means for indicating the thickness of said first liquid layer comprising an elongated strip which contains a chemical which undergoes a color change upon contact with said first liquid layer.

2. The apparatus of claim 1, wherein said elongated indicator strip comprises a dimethylsiloxane polymer and a hydrophobic dye.

3. The apparatus of claim 1, wherein said means for detecting said interface and means for indicating the thickness of said first liquid layer are mounted in a conductive metal rod.

4. The apparatus of claim 3, wherein said conductive metal rod is made of steel.

5. The apparatus of claim 3, wherein said means for indicating the thickness of said first liquid layer is removably mounted in a lengthwise extending elongated slot provided in said conductive metal rod.

6. The apparatus of claim 1, wherein said means for detecting said interface comprises means for measuring an electrical property at said interface.

7. The apparatus of claim 6, wherein said means for measuring an electrical property comprises two electrodes.

8. The apparatus of claim 7, wherein said two electrodes form a galvanic cell.

9. The apparatus of claim 7, wherein said two electrodes form part of an electrical conductivity circuit.

10. An apparatus for measuring the thickness of a layer of a first liquid above an interface formed by the first liquid and a second liquid in an underground formation, said apparatus comprising an elongated steel rod having a lengthwise extending elongated slot provided therein, said elongated steel rod having a proximal end with a threaded cavity provided therein, a distal end which terminates in a sharpened point and comprising a second electrode; a first electrode provided in said steel rod adjacent said distal end; and an elongated indicator strip removably mounted in said elongated slot.

11. The apparatus of claim 10, wherein said indicator strip comprises a dimethylsiloxane polymer and a hydrophobic dye.

12. The apparatus of claim 11, wherein said first electrode and said steel rod form part of an electrical conductivity circuit.

13. The apparatus of claim 11, wherein said first and second electrodes form a galvanic cell.

14. A method for determining the thickness of a layer of a first liquid above an interface formed by the first liquid and a second liquid layer underlying the first liquid in an underground formation, said method comprising the steps of: providing a probe having means for measuring an electrical property of soil adjacent thereto by contacting said soil and an elongated strip which contains a chemical which undergoes a color change upon contact with said first liquid layer; inserting said probe into the ground above the interface formed by the first and second liquid layers; locating said interface by continuing the insertion of the probe into the ground until the electrical property of the soil measured by the probe indicates that the probe has contacted said interface; allowing said elongated strip to contact said first liquid layer; withdrawing the probe from the ground; and determining the thickness of the layer of the first liquid by measuring the portion of said elongated strip which has undergone a color change.

* * * * *

UNITED STATES PATENT AND TRADEMARK OFFICE
CERTIFICATE OF CORRECTION

PATENT NO. : 5 048 334
DATED : September 17, 1991
INVENTOR(S) : Duane R. HAMPTON et al It is certified that error appears in the above-identified patent and that said Letters Patent is hereby corrected as shown below:

Column 6, line 66; change "claim 11" to ---claim 10---.
Column 7, line 1; change "claim 11" to ---claim 10---.

Signed and Sealed this

Thirtieth Day of March, 1993

Attest:

STEPHEN G. KUNIN

*Attesting Officer*   Acting Commissioner of Patents and Trademarks